Dec. 3, 1968
J. D. SUMNER
3,414,273
SEAL FORMING MEANS FOR PIPE JOINTS OF THE
BELL AND SPIGOT TYPE
Filed June 16, 1966
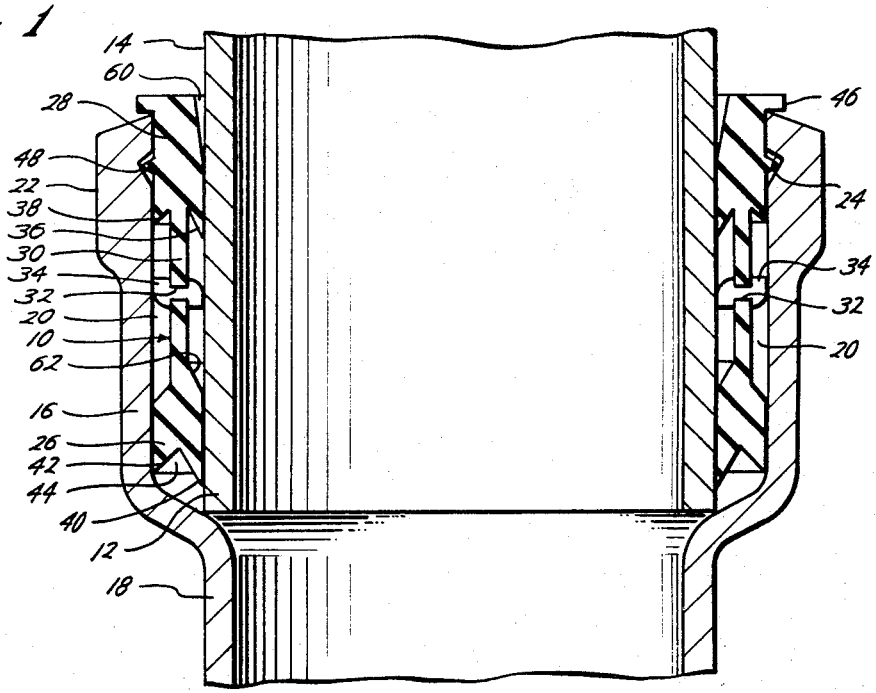
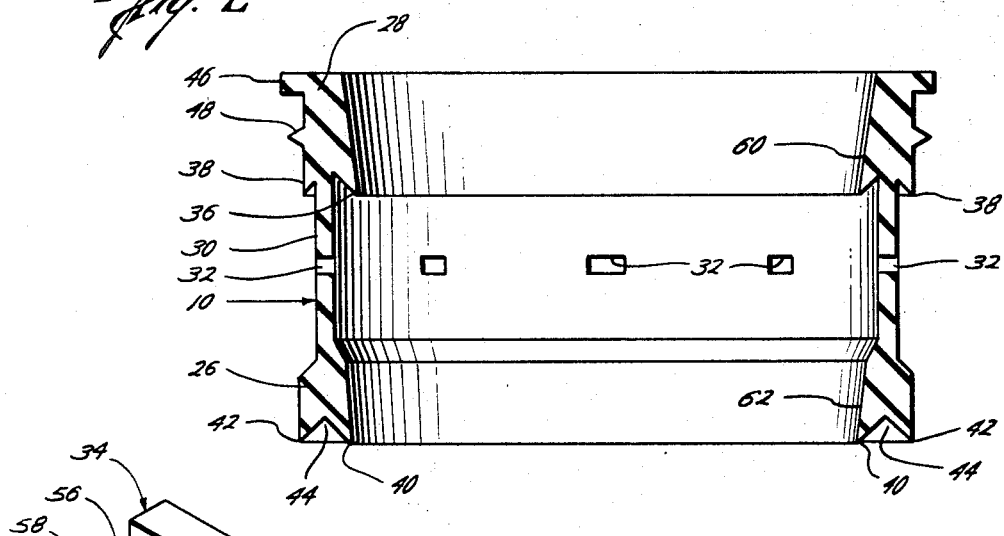
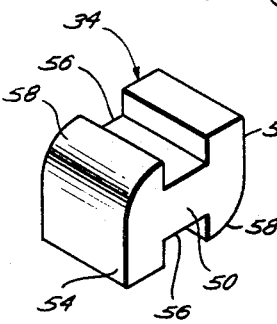
Joe D. Sumner
INVENTOR
BY Charles E. Lightfoot
ATTORNEY

United States Patent Office 3,414,273
Patented Dec. 3, 1968

3,414,273
SEAL FORMING MEANS FOR PIPE JOINTS OF
THE BELL AND SPIGOT TYPE
Joe D. Sumner, 6903 Alderney, Houston, Tex. 77055
Filed June 16, 1966, Ser. No. 557,974
3 Claims. (Cl. 277—11)

ABSTRACT OF THE DISCLOSURE

A seal forming device for use in a pipe joint of the bell and spigot type comprising a generally tubular shaped member formed of resilient material to be positioned in the bell end of one pipe section in surrounding relation to the spigot end of another pipe section to form a sealed joint. The seal forming member is formed with longitudinally spaced, thickened wall portions for sealing engagement with the bell and spigot and a thinner intermediate wall portion which is perforated and through which retainer elements of generally H-shape, formed of metal or the like, are extended and which are formed with curved faces positioned for rocking engagement with the inner surface of the bell and the exterior surface of the spigot to permit the spigot to be easily inserted in the bell through the seal forming member and to exert a camming action thereon to hold the bell and spigot assembled when the spigot is inserted.

---

This invention relates to a seal forming device for pipe joints and more particularly to a device for connecting together pipe sections of the bell and spigot type and which forms a fluid tight seal between the sections.

The invention finds particular application in connection with the connecting together of sections of pipe, such as cast iron soil pipe, concrete sewer pipe, or other pipe of the bell and spigot type.

In the construction of pipe lines by the use of pipe of the bell and spigot type it has been customary heretofore to assemble such pipe by placing the spigot end of one section in the bell end of another section and then inserting suitable packing material into the space within the bell in surrounding relation to the spigot to form a sealed joint. The connection of pipe sections in this manner has been subject to a number of disadvantages in that it is difficult to properly center the spigot in the bell, and the insertion of the packing material, which requires considerable force, is likely to cause misalignment of the sections.

Various means have been suggested for overcoming these difficulties and for facilitating the making up of the pipe joints, such as by the use of prefabricated seal forming elements disposed between the bell and spigot pipe ends. Many such devices, however, have not proven satisfactory because of the difficulty of inserting the spigot end into the packing element when the same is first positioned in the bell, or, when the packing is first applied to the spigot, it is then difficult to insert the packing therewith into the bell, without deforming or otherwise damaging the packing. Moreover, pipe joints of the bell and spigot type, when made up with prefabricated seal forming elements of this kind often fail because of misalignment of the pipe to an extent that the greater compression of the packing at one peripheral portion thereof than at another causes leakage past the seal.

Pipe joints of this kind, making use of preformed sealing means, are not usually capable of withstanding high pressures, so that there is danger of leakage or displacement of the seal forming means when such joints are used in pipe lines employed for the transmission of fluid under substantial pressure, or when the lines are tested by subjecting them to high pressures, as is customary in the testing of plumbing installations.

The present invention has for an important object the provision of a seal forming means for pipe joints of the bell and spigot type embodying a generally cylindrical packing element formed of resilient material having longitudinally spaced, radially thickened wall portions positioned for sealing contact with the external surface of the spigot end of one pipe section and the internal surface of the bell end of another pipe section to form a fluid tight seal between the sections.

Another object of the invention is the provision in a seal forming element of the kind mentioned of retainer means located mediate the radially thickened wall portions of the element which are engageable with the internal surface of the bell and the external surface of the spigot to effectively hold the element against displacement and to securely maintain the joint against disconnection when used under high pressure conditions.

A further object of the invention is to provide a seal forming element for a bell and spigot pipe joint which is constructed to serve as a guiding and centering means for the insertion of the spigot end of one pipe section into the bell end of another pipe section and to form a fluid tight seal between the sections.

A still further object of the invention is the provision of a seal forming element for use in pipe joints of the bell and spigot type, which is of simple design, rugged construction and economical manufacture.

The above and other obvious advantages of the invention will be apparent from the following detailed description of a preferred embodiment of the invention, constituting a specification of the same, when considered in conjunction with the annexed drawings, wherein—

FIGURE 1 is a longitudinal, central, cross-sectional view illustrating the seal forming device of the invention and showing the device installed in a pipe joint of the bell and spigot type;

FIGURE 2 is a longitudinal, central, cross-sectional view of the seal forming device of FIGURE 1, apart from the pipe joint and with the spacing and centering elements removed therefrom; and FIGURE 3 is a perspective view on an enlarged scale of one of the spacer elements of the seal forming device of the invention.

Briefly described the invention comprises a seal forming element of generally cylindrical shape, formed of suitable resilient material, such as rubber, adapted to be positioned about the spigot end of a section of pipe within the bell end of another pipe section to form a sealed joint between the sections, and formed with inner and outer longitudinally spaced radially thickened wall portions each having inner and outer annular seal forming lip portions positioned for sealing engagement with the bell and spigot ends of the pipe sections, and including a wall portion of reduced thickness extending between such thickened portions and which carries peripherally spaced camming or locking elements extending radially inwardly and outwardly from the reduced wall portion in position for engagement with the external surface of the spigot and the internal surface of the bell to hold the bell and spigot against relative longitudinal movement when the joint is assembled. The seal forming device of the invention is shaped to perform a guiding and centering function in engagement with the pipe sections in assembling the joint as well as forming a seal between the same.

In the present illustration the seal forming device, generally designated 10 in the drawings, is shown in FIGURE 1 positioned between the spigot end 12 of a section of pipe 14 and the bell end 16 of another pipe section 18 to form with the sections a sealed pipe joint.

The sections of pipe 14 and 18 may be of a conventional type, such as cast iron soil pipe, concrete sewer pipe, or the like, each having at one end a straight spigot end and at the other end a bell end portion of enlarged internal diameter into which the spigot end of another pipe section may be inserted with radial clearance between the parts, as seen at 20 to provide an annular space to receive the packing.

The bell end portion 16 may be formed with a radially outwardly thickened, annular, outer end portion or rim 22, within which the usual internal annular groove 24, commonly known as a lead retaining groove, is located, whose side walls preferably converge toward the bottom of the groove.

The seal forming element 10 of the invention may be conveniently formed of a material, such as rubber, plastics, or the like, capable of forming a fluid tight seal between the parts, and is of generally cylindrical shape, having longitudinally spaced, inner and outer, radially thickened annular wall portions 26 and 28, respectively, between which is located a wall portion 30 of substantially reduced thickness. The reduced wall portion 30 is located radially mediate the inner and outer circumferential faces of the thickened wall portions 26 and 28, and is provided mediate its ends with a plurality of circumferentially spaced openings 32, through which retainer or locking elements 34 are inserted in position for engagement with the inner surface of the bell 16 and the outer surface of the spigot 12 to hold the parts in assembled condition and in substantial concentric arrangement.

The outer wall portion 28 of the seal forming element is formed at its inner end with inner and outer, inwardly directed, annular sealing lips 36 and 38 respectively, and the inner wall portion 26 has similar lips 40 and 42, forming an annular inner end groove 44 in the element.

At its outer end the element 10 is provided with an external, annular shoulder 46 positioned for engagement with the outer end of the externally thickened rim 22, to limit the distance to which the element may be inserted in the bell, and the element is also provided with an external, annular projection or bead 48 positioned to be in the internal groove 24 when the shoulder 46 is in engagement with the outer end of the bell, whereby the element will be retained in the bell.

For the purpose of enabling the pipe made up with the seal forming means of the invention to withstand high pressure without blowing out the packing or causing the joints to be disconnected, retainer or locking elements, such as that shown in FIGURE 3 are disposed in the openings 32, which elements are of generally H-shape, having a web portion 50 which connects together the two head portions 52, 54 to form opposite grooves 56 into which marginal portions of the wall 30 adjacent the opening 32 extend when the element is positioned therein. The heads 52 and 54 are formed with rounded external cam or locking surfaces 58, the surface 58 of the head 52 being positioned to be rollingly or rockingly engaged with the free end of the spigot 12 as the spigot is inserted in the bell, and the surface 58 of the head 54 being positioned for similar engagement with the internal surface of the bell as the element 10 is inserted in the bell. Thus, when the pipe joint has been assembled, as shown in FIGURE 1, the heads 54 of the cam or locking elements will be in contact with the internal surface of the bell, while the heads 52 of the elements will be in engagement with the external surface of the spigot to wedgingly or cammingly resist outward displacement of the sealing means or disconnection of the joint.

The retainer elements 34 may be formed with the curved faces 58 spaced apart at a distance somewhat greater than the distance between the faces 52 and 54 of the elements, so that the elements may have a rocking or rolling contact with the bell and spigot and may exert a camming or locking action on the parts to hold the parts assembled and hold the seal forming means in place.

At its outer end the element 10 may be formed with an inwardly tapering end bore portion 60, whose outer end is somewhat larger in diameter and whose inner end is somewhat smaller in diameter than the external diameter of the spigot 12, whereby the spigot may be readily inserted through the portion 60 and will have a tight sealing engagement therewith when inserted. The inner, thickened, wall portion 26 of the element 10 is similarly provided with a tapered bore 62 through which the spigot 12 is inserted for tight sealing engagement with the element.

In assembling the pipe joint, the seal forming element may be inserted in the bell 16 until the shoulder 46 is in engagement with the outer end of the bell and the bead 48 is disposed in the internal groove 24. When thus inserted, it will be apparent that the seal forming element will be retained against fall out of the bell by the bead 48 extending into the groove 24. The spigot end 12 may then be inserted through the bore 60 and bore 62 into tight sealing engagement with the lips 36 and 40, and to compress the thickened portions 26 and 28 between the bell and spigot to sealingly engage the lips 38 and 42 against the internal surface of the bell. During the insertion of the spigot the faces 58 of the camming or locking elements 34 will be rockingly engaged with the spigot and bell to allow the elements to turn to adjust themselves to the width of the space 20, and when the parts have been thus assembled the elements 34 will be positioned to perform a camming or locking action to prevent disconnection of the parts or the blowing out of the seal forming means under the pressure of fluid in the pipe.

It will thus be seen that the invention constructed and applied as described above provides a seal forming means for pipe joints of the bell and spigot type which is easily applied and by which a secure, fluid tight connection between the parts may be assured.

The invention is disclosed herein in connection with a particular embodiment of the same, which is intended by way of example only, and it will be understood that various modifications can be made in the seal forming element within the spirit of the invention and the scope of the appended claims.

Having thus clearly shown and described the invention, what is claimed as new and desired to secure by Letters Patent, is:

1. In a pipe joint the combination with a section of pipe having a spigot end and another section of pipe having a bell end whose internal diameter is substantially larger than the external diameter of said spigot end of a seal forming element of generally tubular shape formed of resilient material disposed in said bell end and into which said spigot end is inserted, said element having radially thickened, annular wall portions positioned in sealing engagement with the inner surface of said bell end and with the external surface of said spigot end at longitudinally spaced locations on said ends to form a seal between the ends, and formed with peripherally spaced perforations mediate said thickened wall portions, and retainer means extending through said perforations in position for engagement with the internal surface of said bell end and the external surface of said spigot end and formed with curved faces positioned for rocking engagement with such surfaces to exert a camming action thereon to hold the bell and spigot against relative longitudinal movement.

2. The combination claimed in claim 1 wherein said seal forming element is formed with an external annular, radially outwardly extending portion positioned for engagement with the outer end of said bell end to limit the inward movement of said element in said bell end.

3. The combination claimed in claim 2 wherein said spigot end and said element are formed with interengageable means positioned for interengagement to resist longitudinal movement of the element in the bell end when said outwardly extending portion is in engagement with said outer end of the bell end.

References Cited

UNITED STATES PATENTS

| | | | |
|---|---|---|---|
| 2,924,472 | 2/1960 | Bush | 277—207 |
| 2,935,349 | 5/1960 | Burch | 277—207 |
| 3,325,174 | 6/1967 | Weaver | 277—168 |

SAMUEL ROTHBERG, *Primary Examiner.*